(12) United States Patent
Seidel

(10) Patent No.: US 10,374,824 B2
(45) Date of Patent: Aug. 6, 2019

(54) COMMUNICATION SYSTEM FOR ACTUATION OF MULTIPLE SUBSCRIBERS IN A MOTOR VEHICLE, AND DATA BUS FOR SUCH A COMMUNICATION SYSTEM

(71) Applicant: LEONI BORDNETZ-SYSTEME GMBH, Kitzingen (DE)

(72) Inventor: Toralf Seidel, Giebelstadt (DE)

(73) Assignee: LEONI Bordnetz-Systeme GmbH, Kitzingen (DE)

( * ) Notice: Subject to any disclaimer, the term of this patent is extended or adjusted under 35 U.S.C. 154(b) by 60 days.

(21) Appl. No.: 15/593,628

(22) Filed: May 12, 2017

(65) Prior Publication Data

US 2017/0264456 A1 Sep. 14, 2017

Related U.S. Application Data

(63) Continuation of application No. PCT/EP2015/076234, filed on Nov. 10, 2015.

(30) Foreign Application Priority Data

Nov. 12, 2014 (DE) ........................ 10 2014 223 122

(51) Int. Cl.
*H04L 12/28* (2006.01)
*H04L 12/403* (2006.01)
(Continued)

(52) U.S. Cl.
CPC ............ *H04L 12/403* (2013.01); *B60Q 3/70* (2017.02); *B60Q 3/80* (2017.02);
(Continued)

(58) Field of Classification Search
CPC ............ H04L 12/403; H04L 12/40071; H04L 2012/40273; B60Q 3/70; B60Q 3/80; H05B 33/0842; H05B 37/0254
(Continued)

(56) References Cited

U.S. PATENT DOCUMENTS 8,553,681 B2 * 10/2013 White ................. H04M 3/4228
370/352
2004/0174880 A1 * 9/2004 White ................. H04M 3/4228
370/395.3
(Continued)

FOREIGN PATENT DOCUMENTS

DE 102004063213 A1 7/2006

*Primary Examiner* — Chuong T Ho
(74) *Attorney, Agent, or Firm* — Laurence A. Greenberg; Werner H. Stemer; Ralph E. Locher

(57) ABSTRACT

A communication system is used to actuate multiple subscribers, particularly LED modules within a motor vehicle, specifically for ambient lighting. The communication system has a controller and subscribers. The subscribers are connected in series in a ring structure via a data line and each has a control unit. For actuating the individual subscribers, a data bus having a communication protocol, which has a linear juxtaposition of data packets, is used, wherein for each subscriber, a subscriber-specific data packet is provided. A respective data packet is divided into a subscriber portion and an information portion. The information portion contains a respective piece of information about the status of a subsequent subscriber portion. The information portion is overwritable by a respective subscriber. Each subscriber evaluates the respective first data packet that has the status "not received" and changes the status to "received". This provides a communication system that requires no addressing.

17 Claims, 2 Drawing Sheets

(51) Int. Cl.
*H04L 12/40* (2006.01)
*H05B 37/02* (2006.01)
*H05B 33/08* (2006.01)
*B60Q 3/80* (2017.01)
*B60Q 3/70* (2017.01)

(52) U.S. Cl.
CPC ... *H04L 12/40071* (2013.01); *H05B 33/0842* (2013.01); *H05B 37/0254* (2013.01); *H04L 2012/40273* (2013.01)

(58) Field of Classification Search
USPC .......................................................... 370/258
See application file for complete search history.

(56) References Cited

U.S. PATENT DOCUMENTS

| | | | |
|---|---|---|---|
| 2008/0002737 A1* | 1/2008 | Schwenkel | G05B 19/042 370/463 |
| 2010/0150142 A1* | 6/2010 | White | H04M 3/4228 370/352 |
| 2011/0016373 A1* | 1/2011 | Teruyama | H04L 69/18 714/799 |
| 2011/0035404 A1 | 2/2011 | Morgan et al. | |
| 2011/0170429 A1* | 7/2011 | Cao | H04L 47/122 370/252 |
| 2012/0299480 A1 | 11/2012 | Peting et al. | |

* cited by examiner

COMMUNICATION SYSTEM FOR ACTUATION OF MULTIPLE SUBSCRIBERS IN A MOTOR VEHICLE, AND DATA BUS FOR SUCH A COMMUNICATION SYSTEM

CROSS-REFERENCE TO RELATED APPLICATION

This is a continuation application, under 35 U.S.C. § 120, of copending international application No. PCT/EP2015/076234, filed Nov. 10, 2015, which designated the United States; this application also claims the priority, under 35 U.S.C. § 119, of German patent application No. DE 10 2014 223 122.1, filed Nov. 12, 2014; the prior applications are herewith incorporated by reference in their entirety.

BACKGROUND OF THE INVENTION

Field of the Invention

The invention relates to a communication system for actuating multiple subscribers in a motor vehicle, containing a controller and a number of subscribers. The invention additionally relates to a data bus for such a communication system.

In modern motor vehicles, increasingly more ambient lighting elements, particularly on an LED basis, are used. These ambient lighting elements are actuated by a central control device on the basis of the situation. The lighting elements are in this case arranged in a distributed fashion inside the motor vehicle. A multiplicity of individual LED modules are then actuated, each LED module usually having a control unit in the form of a driver or an IC and also multiple light emitting diodes in different colors. Every single one of these LED modules needs to be actuated and supplied with power.

At the same time, control and monitoring of the operability of the ambient lighting is desired. Actuating the individual LED modules and monitoring them therefore requires an effective communication system for communication between the central control device and the individual LED modules. At the same time, particularly in the case of motor vehicles, there is the aim of control and communication systems that are as inexpensive as possible and at the same time reliable.

There are already different bus systems known for the data communication inside the motor vehicle, such as what is known the LIN bus or the CAN bus, for example. In the case of the CAN bus, the data transmission is effected via 2 data lines (2-wire bus). Additionally, each bus subscriber needs to be allocated a bus address. The use of a CAN bus for actuating a multiplicity of LED modules would therefore be comparatively complex.

In the case of the LIN bus, there is fundamentally the possibility of what is known as self-addressing, which allows the individual subscribers to be installed without previous addressing. The LIN bus is frequently used for inexpensive communication by sensors and actuators with integrated intelligence in the motor vehicle. This is a single-wire bus, which means that the LIN bus can be implemented inexpensively. However, the LIN bus standard is restricted to a maximum of 64 addresses in a LIN bus network, and only 16 subscribers are recommended. In the case of ambient lighting with a multiplicity of LED modules, this is frequently inadequate.

SUMMARY OF THE INVENTION

Against this background, the invention is based on the object of providing a simple and inexpensive communication system for a multiplicity of subscribers particularly in a motor vehicle.

The object is achieved according to the invention by a communication system for actuating multiple subscribers particularly in a motor vehicle. In this case, the communication system has a controller, which is integrated in a central control device, for example, and a multiplicity of subscribers. The subscribers are in this case connected in series one after the other by their hardware by a data line to form a subscriber chain. They are therefore arranged linearly, that is to say have a linear topology. The subscribers are intelligent subscribers insofar as they each have a control unit. This control unit is particularly an IC (integrated circuit) component. For communication with and actuation of the subscribers, a data bus having a communication protocol that has a linear array of data packets is used. For each subscriber, a subscriber-specific data packet is contained in the communication protocol. A respective data packet is an array of individual bits, which is to say of logic ones or zeros. A respective data packet is in this case divided into a subscriber portion and an information portion, which precedes the subscriber portion particularly in a manner of a header. The information portion contains a piece of information about the status of the subsequent subscriber portion of the data packet. In particular, the information portion stores the status regarding whether this data packet and hence the subscriber portion has already been received by a subscriber or has not been received. The subscriber portion first contains actuation information that is intended for a subscriber for the purpose of actuating said subscriber.

The information portion first contains the status "not received". It is now of particular importance that each subscriber is capable of overwriting this information portion and changing the status, particularly to the status "received". As soon as a respective subscriber receives the communication protocol with the multiplicity of data packets, the respective subscriber successively checks the information portions of the data packets. Those data packets for which the status in the information portion is at "received" are ignored by the respective subscriber. As soon as this subscriber encounters a data packet having the status "not received", this subscriber identifies this data packet as its applicable subscriber-specific data packet and uses the information contained in the subscriber portion. Subsequently, this subscriber changes the status in the information portion to "received" and finally forwards the communication protocol to the next subscriber within the subscriber chain.

The configuration of the communication system with the specific communication protocol first attains the particular advantage that there is no need and accordingly also no provision for addressing within the communication protocol for actuating the individual subscribers. The addressing is effected implicitly by the linear topology of the subscribers and the correspondingly linear design of the communication protocol with the array of the individual data packets. The association of the individual data packets of the communication protocol with the individual subscribers is made by the position of the respective subscriber-specific data packet within the communication protocol. This means that the order of the data packets in the communication protocol for the individual subscribers corresponds to the order of the subscribers within the subscriber chain. The status information contained in a respective data packet and the overwriting of this status information by the individual subscribers means that this efficiently ensures that each subscriber uses and evaluates precisely the data packet that is relevant to it. Overall, this allows a very simple design of the data bus. The association of the data packets for the individual subscribers is therefore made in a similar manner to in the case of a shift register: the first register space is provided for the first subscriber and is more or less used up by the overwriting of the status information, so that the next register space is active. In comparison with bus systems using addressing, the complexity for the association is therefore substantially lower. The subscribers are therefore also of comparatively simple design and particularly have no processor. The integrated control unit is preferably merely a simple IC chip that is responsible for writing to the subscriber-specific data packet.

At the same time, the ability to write to the respective data packet allows the possibility of storing subscriber-specific information, so that fundamentally not only unidirectional communication between the controller and the respective subscriber but also bidirectional communication with a data transmission from the respective subscriber to the controller takes place. Overall, an efficient and inexpensive communication system is therefore made possible.

With regard to a hardware configuration of the communication system, the individual subscribers are usefully connected to one another in series merely by means of a single wire for the data transmission and data communication. Therefore, a single-wire data line is thus fundamentally already adequate. In addition to this single-wire data line, the individual subscribers are also connected to a usually two-wire supply line via which a power supply is provided. On account of the nature of the individual subscribers, this is particularly a low-voltage supply and the supply voltage is merely 5 volts, for example.

Preferably, the subscribers are incorporated in the single-wire data line in a simple ring structure in this case, wherein exclusively the last subscriber in the subscriber chain is again connected to the controller. The direction of the data transmission is therefore provided exclusively in a direction from the controller via the subscribers and from the last subscriber back to the controller again. Such a configuration allows particularly simple production of the communication system. The individual subscribers need be incorporated into the single-wire data line only by a data input and by a data output. Two successive subscribers are therefore each connected to one another by means of a line section that is connected to the data output of the preceding subscriber and to the data input of the subsequent subscriber. The single-wire data line can by and large be divided into a first feed line section from the controller to the last subscriber and a return line section between the last subscriber and the controller. The feed line section in turn is made up of the individual sections between the subscribers. In this respect, it forms a forward channel for the data and the return line section forms a return channel for the data. There is no provision for further data line sections. In the case of bidirectional communication, the return information is therefore transmitted from a subscriber to the controller via the return line section. The return line section is therefore likewise a single-wire connection between the last subscriber and the controller.

The individual subscribers are preferably arranged within a cable set particularly of a motor vehicle onboard electrical system. In a particularly advantageous configuration, they are then part of an integrated cable set. This is understood to mean that the individual subscribers are integrated directly in the cable set in a plug-free fashion, i.e. the individual lines, that is to say the in particular merely single-wire data line and the supply lines, are connected to the individual wires of the cable set directly by suitable contact-connections. To this end, the individual subscribers are connected to the lines by crimping, soldering, etc., for example. The integrated cable set is therefore a plug-free, prefabricated cable set with the multiplicity of subscribers. Additionally, the controller is also part of the cable set, which means that the cable set can by and large also be referred to as an intelligent cable set. Alternatively, the cable set is connected to a control device, for example by means of a plug. The controller for actuating the individual subscribers is then contained inside the control device.

In a preferred configuration, at least a number of the subscribers transmit subscriber-specific information to the controller. This subscriber-specific information is particularly self-diagnosis values. A respective subscriber is therefore capable particularly of self-diagnosis that is to say of checking its own correct operability, and of delivering an error signal if an error is identified during the self-diagnosis. In particular, the subscriber is an LED module. During the self-diagnosis, a check is performed to determine whether all individual LEDs are still operational, for example.

Alternatively, a respective subscriber is a sensor that is designed to measure ambient parameters, for example. The sensor then transmits its measurement information to the controller. The measurement information is measured values for temperature, pressure, etc., for example. Finally, the subscriber may also be an actuator that is used to operate a switch or a valve, for example, or perhaps to move a component.

Usefully, the data transmission to the controller is effected in this case by virtue of a respective subscriber overwriting the subscriber portion. That is to say that the actuation information that the subscriber portion contains for the respective subscriber is deleted and replaced by the subscriber-specific information. This measures means that there is therefore no additional space required within the communication protocol. The total number of individual information units (bits) within the communication protocol remains the same, in particular.

Preferably, each subscriber overwrites the subscriber portion with at least a piece of status information for self-diagnosis.

In a preferred development, each of the data packets additionally contains a checksum that can be used to check the integrity of the data contained in the data packet. In this case, the check is usefully performed by the controller, which means that the latter has the opportunity to check the data transmitted by the subscriber for integrity. The checksum therefore ensures at least a plausibility check.

The controller and the individual subscribers are usefully arranged in a ring structure for the bidirectional communication, as already mentioned. They are therefore in a linear array, wherein the controller first delivers the communication protocol with the individual data packets to the first subscriber, the communication protocol with the data packets is then progressively forwarded by the individual subscribers, until it is finally returned to the controller again by the last subscriber. The controller and the subscribers are therefore connected to one another in a ring fashion by the data line.

Usefully, the controller at the end of the subscriber chain checks whether the subscriber chain is correct. To this end, it preferably analyzes the communication protocol received. In this case, there are various analysis options available:

first, the controller accomplishes this by evaluating the individual overwritten subscriber-specific information in the subscriber portion, particularly the subscriber-specific status information. A check is moreover also possible on the basis of the status information contained in the information portion. As such, the controller identifies an inconsistency in the event of data packets having the status "not received" returning, for example. This indicates that not all subscribers are operational.

Particularly in order to allow this, the number of subscriber-specific data packets within the communication protocol preferably matches the number of subscribers contained in the subscriber chain, i.e. the number of subscriber-specific data packets corresponds to the number of subscribers within the subscriber chain. As result of this measure, more or less the controller or the communication protocol therefore stipulates the number of subscribers and hence also determines the last subscriber. Inside the subscriber, there is therefore no need for information about the position thereof to be stored. This arises exclusively by virtue of its position within the subscriber chain.

Alternatively or additionally, the communication protocol moreover contains a control data packet that is appended to the subscriber-specific data packets particularly at the end of the communication protocol. If the control data packet is, by way of example, the first data packet with the status "not received", then the controller identifies that the subscriber chain is operating correctly.

As already mentioned, the individual subscribers are preferably LED modules each having a control unit and a plurality of individual LEDs. In particular, each LED module contains a red, blue and green and preferably additionally also a white LED, so that all colors can be provided by each LED module.

Alternatively, the subscribers, as already likewise mentioned, are, in a useful configuration, sensors or perhaps actuators. Within the subscriber chain, there may in this case also be different types of subscribers arranged, that is to say, by way of example, sensors and actuators or perhaps LED modules and sensors/actuators. In a preferred configuration, the subscribers are exclusively LED modules that are used particularly for ambient lighting, however.

In order to ensure as high a data rate as possible even for a multiplicity of subscribers, the individual data packets are kept as compact as possible. As such, the subscriber portion of each data packet is preferably restricted to a maximum of 64 bits and particularly to 32 or 24 bits. In the case of LED modules, 8 bits are held for every single LED. In the case of a four-color LED module, 32 bits are therefore reserved, and in the case of an RGB configuration with just three LEDs, 24 bits are reserved. As compact a bit sequence as possible is likewise used for the information portion of the data packet. This is preferably a maximum of 16 bits and particularly a maximum of 8 or 4 bits. In the simplest case, the status information contained in the information portion is encoded by a logic zero for "not received" or by a logic one for "received". Additionally, usefully only a maximum 8-bit bit sequence and preferably merely a 4-bit sequence is likewise used for the aforementioned checksum of a respective data packet.

During operation, a communication system of this kind is used in a motor vehicle and installed therein. Alternatively, the communication system described here is also used for other applications and is not restricted to use for a motor vehicle.

The object is additionally achieved according to the invention by a data bus for the communication system. The features and preferred configurations presented for the communication system can also be transferred mutatis mutandis to the data bus.

Other features which are considered as characteristic for the invention are set forth in the appended claims.

Although the invention is illustrated and described herein as embodied in a communication system for actuation of multiple subscribers in a motor vehicle, and a data bus for such a communication system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
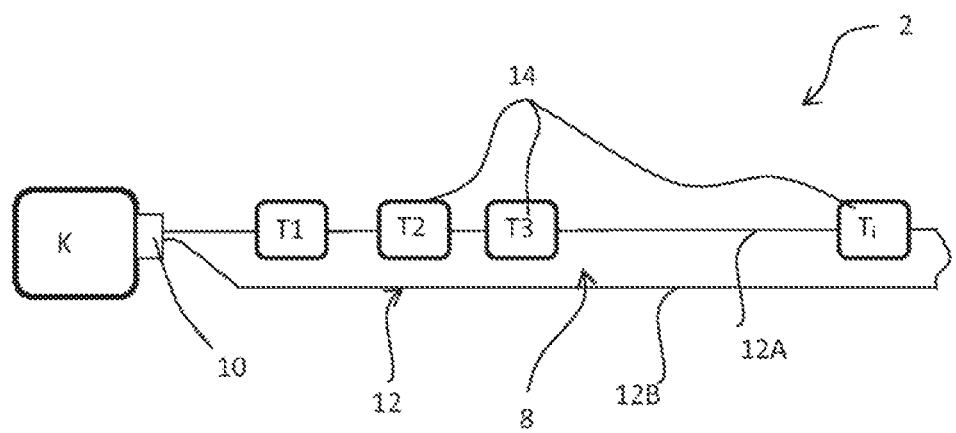
FIG. 1 is a highly simplified schematic depiction of a communication system with a controller and a multiplicity of subscribers according to the invention.

Referring now to the figures of the drawings in detail and first, particularly to FIG. 1 thereof, there is shown a communication system 2 which has a controller K and a multiplicity of individual subscribers Ti, i being a sequential index where i=1 to n and n being the total number of subscribers Ti. The individual subscribers Ti are in this case part of an integrated cable set 8 that, in the exemplary embodiment, is connected to the controller K by a plug connection 10. In the exemplary embodiment of FIG. 1, a direct plug connection 10 to the controller K is indicated in this case. Alternatively, there is also the possibility of the controller K being arranged remotely from the integrated cable set 8 and being connected to this integrated cable set by a further cable connection. The controller K is arranged, by way of example, in a central control device, which is not depicted in more detail here. The communication system 2 is particularly arranged inside a motor vehicle. The subscribers Ti are particularly LED modules and the whole communication system 2 is used for ambient lighting inside a motor vehicle interior.

The individual subscribers Ti are lined up in linear succession and connected to one another by an in particular single-wire data line 12, so that a subscriber chain 14 is formed, which is also referred to as a "daisy chain". The data line 12 begins and ends at the controller K, so that a ring structure is formed. It is broken down into a single-wire feed line section 12A from the controller K to the last subscriber Ti and a single-wire return line section 12B from the last subscriber Ti directly to the controller K.

Figure 2:
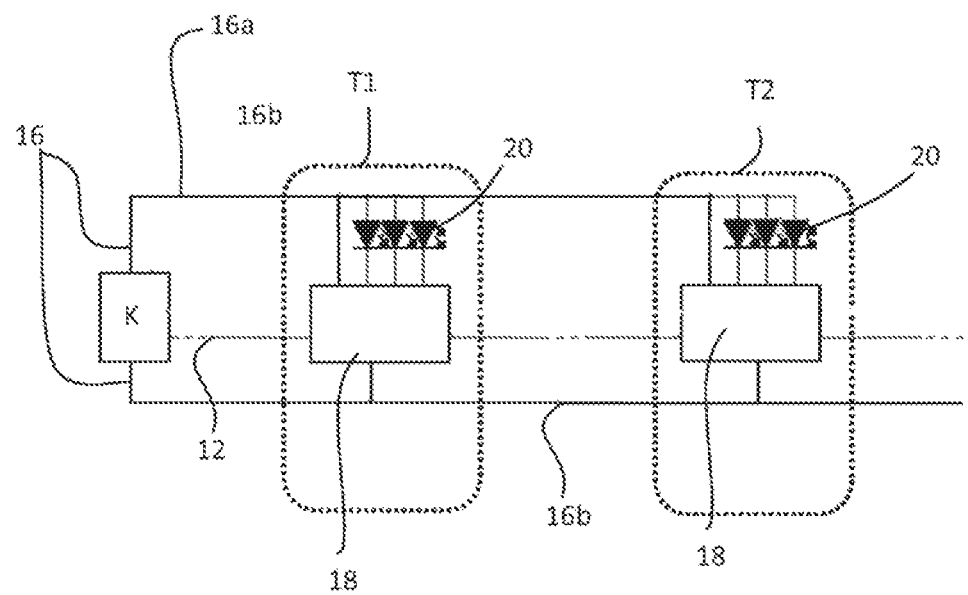
FIG. 2 is a schematic detailed depiction of the controller with two subscribers.

Besides the data line 12, the integrated cable set 8 additionally also preferably has a two-wire supply line 16, as depicted by way of example in FIG. 2 (not contained in FIG. 1).

One wire 16a of the supply line 16 provides a voltage potential of 5 volts, for example. The second wire 16b is at ground potential, for example. FIG. 2 additionally depicts the data line 12 by which the individual subscribers Ti are connected to one another in series. A respective subscriber Ti has an integrated control unit 18 and multiple LEDs 20. In the exemplary embodiment, three LEDs 20 for the colors red, green and blue are depicted. Preferably, there is additionally also a white LED provided as a fourth LED. The control unit 18 and the individual LEDs 20 are usefully arranged on a common circuit board of the respective subscriber Ti referred to as an LED module.

Figure 3:
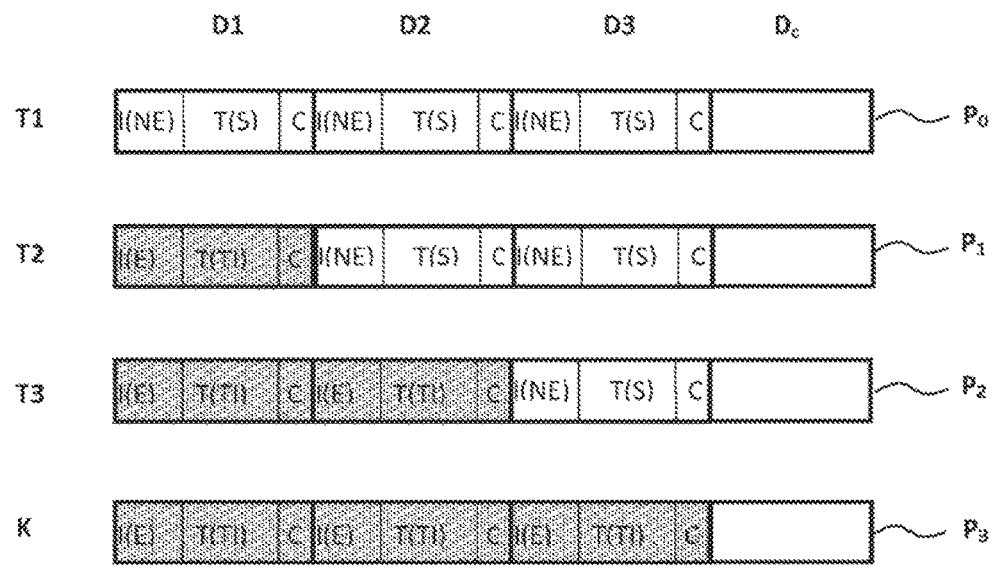
FIG. 3 is a simplified depiction of the communication protocol and the successive execution of the communication protocol within the subscriber chain of the communication system.

The controller K communicates with and actuates the individual subscribers Ti using a data bus that uses a communication protocol P, as explained in more detail with reference to FIG. 3. FIG. 3 is also used to explain the serial communication between the controller K and the individual subscribers Ti within the ring structure. By way of example, this is illustrated on the basis of three subscribers Ti, namely the first subscriber T1, the second subscriber T2 and the third subscriber T3, and also the controller K. Since the communication protocol P is modified for each subscriber Ti, the different communication protocols Pi are likewise provided with a sequential index. The original communication protocol output by the controller has the sequential index 0.

The communication protocol Pi is made up of multiple subscriber-specific data packets Di, the index i being a sequential index for the respective subscriber Ti. In the exemplary embodiment, a communication protocol for 3 subscribers Ti is depicted by way of example. In addition, the communication protocol K in the exemplary embodiment also has a control data packet Dc at the end of the individual subscriber-specific data packets Di.

A respective subscriber-specific data packet Di is formed by a bit sequence, that is to say a linear succession of logic ones and zeros, the bit sequence being divided into at least two portions, namely an information portion I and a subscriber portion T. In the exemplary embodiment, there is also a bit sequence for a checksum C contained at the end of the respective subscriber-specific data packet Di.

A piece of information about the status of the subscriber T is contained inside the information portion I. Specifically, in the exemplary embodiment, a distinction is drawn here between the status "not received" and the status "received". This is characterized in FIG. 3 by the label I(NE) for the status "not received" and by I(E) for the status "received".

Accordingly, the subscriber portion T has control information for actuation for a respective subscriber Ti. This is denoted by T(S) in FIG. 3. If the subscriber portion T is overwritten with subscriber-specific information, however, this is denoted by T(TI) in FIG. 3. In addition, the data packets Di that are overwritten with subscriber-specific information TI have a grey background. The communication within the communication system 2 is as now described.

The controller K delivers the communication protocol P0 having the subscriber-specific data packets Di to the first subscriber Ti. All of the subscriber-specific data packets Di show the status "not received" (T(NE)) in the information portion I. This indicates that the respective data packet Di has not yet reached the associated subscriber Ti and been received thereby. In addition, the respective subscriber portion T contains respective actuation information S. The first subscriber T1 therefore receives the original communication protocol P0, as depicted in the first row of FIG. 3.

The subscriber T1 uses the first data packet D1 and takes the applicable control information S contained therein. Subsequently, the first subscriber T1 overwrites the status information to "received" and at the same time preferably also overwrites the subscriber portion T with subscriber-specific information TI.

The communication protocol modified in such a way is forwarded as communication protocol P1 to the next subscriber T2. The latter—like every other subscriber 6 too—first evaluates the information portion I. In this case, the respective subscriber Ti ignores the respective data packet Di until it encounters the first data packet Di, for which the information portion I contains the status "not received". The respective subscriber Ti then takes this as the data packet Di intended for it and uses the control information S contained therein. Subsequently, the respective subscriber Ti writes to the information portion of the data packet Di, changes the status to "received" and also writes to the subscriber portion T thereof. This takes place progressively until all data packets Di have been modified and written to. Each subscriber-specific data packet Di therefore has the status "received" in the information portion I at the end of the subscriber chain 14 and additionally contains subscriber-specific information TI in the subscriber portion T. This communication protocol P3 modified by the last subscriber Tn is then finally transmitted back to the controller K. The latter first uses the checksums C of the individual data packets Di to check the information contained in the respective subscriber portion T for integrity. Finally, the controller K also uses control data packet Dc to check whether the subscriber chain 14 is correctly operational.

Figure 4:
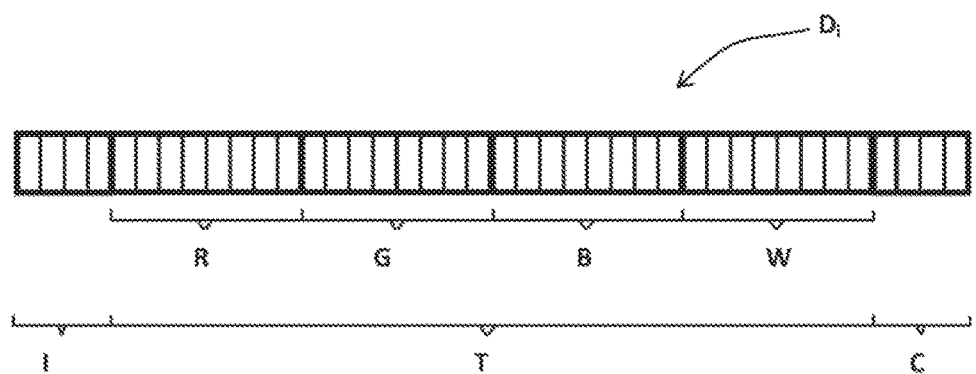
FIG. 4 is an illustration showing a bit sequence of a respective subscriber-specific data packet within the communication protocol.

FIG. 4 finally also depicts, by way of example, a bit sequence of a respective subscriber-specific data packet Di, particularly for the instance of application in which the subscriber Ti is a four-color LED module. For each of the four colors red, green, blue and white, a respective 8-bit data sequence R,G,B,W is reserved. This 4×8-bit data sequence forms the subscriber portion in this case. This is preceded by the information portion I, which is represented by a 4-bit data sequence in the exemplary embodiment. The subscriber portion T is finally followed by the checksum C, which is represented by a 4-bit data sequence.

The following is a summary list of reference numerals and the corresponding structure used in the above description of the invention:

2 Communication system
8 Integrated cable set
10 Plug connection
12 Data line
12A Feed line section
12B Return line section
14 Subscriber chain
16 Supply line
16a,b Wire
18 Control unit
20 LED
K Controller
Ti Subscriber
Di Subscriber-specific data packet
I Information portion
T Subscriber portion
S Control information
TI Subscriber-specific information
C Checksum
Dc Control data packet
P Communication protocol

The invention claimed is:

1. A communication system for a motor vehicle, the communication system comprising:
a controller;
a data line;
a plurality of subscribers, said subscribers being connected in series one after another by means of said data line to form a subscriber chain, each of said subscribers having a control unit, said subscribers being actuated by said data line and a communication protocol, the communication protocol having a linear array of data packets, wherein a subscriber-specific data packet is provided for each of said subscribers, a respective subscriber-specific data packet is divided into a subscriber portion and an information portion, the information portion containing a piece of information that a respective subscriber can write to about a status of the subscriber portion, the respective subscriber using a first subscriber-specific data packet with a status "Not received" as its applicable data packet and changes the status to "Received"; and
said controller and said subscribers forming a ring structure and said controller at an end of the subscriber chain checks whether the subscriber chain is correct.

2. The communication system according to claim 1, wherein said data line has a single wire for a data transmission by means of which said subscribers are connected to one another in series.

3. The communication system according to claim 1, wherein said subscribers are connected to one another in series in said ring structure and exclusively a last of said subscribers is connected to said controller by means of a return line section of said data line.

4. The communication system according to claim 1, further comprising a supply line, wherein individual ones of said subscribers are part of an integrated cable set in which said subscribers are connected directly to said data line and said supply line in a plug-free fashion.

5. The communication system according to claim 1, wherein at least a number of said subscribers overwrite the subscriber portion with subscriber-specific information.

6. The communication system according to claim 5, wherein the subscriber-specific information includes measured values or self-diagnosis values.

7. The communication system according to claim 1, wherein the subscriber-specific data packet has a checksum that can be used to check an integrity of data contained in the subscriber-specific data packet.

8. The communication system according to claim 1, wherein a number of subscriber-specific data packets corresponds to a number of said subscribers plus any control data packet.

9. The communication system according to claim 1, wherein said subscribers are LED modules.

10. The communication system according to claim 1, wherein said subscribers are sensors.

11. The communication system according to claim 1, wherein the subscriber portion has a maximum of 64 bits.

12. The communication system according to claim 1, wherein the information portion contains a maximum of 16 bits.

13. The communication system according to claim 1, wherein the subscriber portion has a maximum of 24 bits.

14. The communication system according to claim 1, wherein the subscriber portion has a maximum of 32 bits.

15. The communication system according to claim 1, wherein the information portion contains a maximum of 4 bits.

16. A communication system for a motor vehicle, the communication system comprising:
a controller;
a data line;
a plurality of subscribers, said subscribers being connected in series one after another by means of said data line to form a subscriber chain, each of said subscribers having a control unit, said subscribers being actuated by said data line and a communication protocol, the communication protocol having a linear array of data packets, wherein a subscriber-specific data packet is provided for each of said subscribers, a respective subscriber-specific data packet is divided into a subscriber portion and an information portion, the information portion containing a piece of information that a respective subscriber can write to about a status of the subscriber portion, the respective subscriber using a first subscriber-specific data packet with a status "Not received" as its applicable data packet and chances the status to "Received; and
at an end of the communication protocol there is a control data packet contained for said controller that said controller uses to check whether the subscriber chain is correct.

17. An operating method, which comprises the steps of:
providing a communication system, containing:
a controller;
a data line;
a plurality of subscribers, said subscribers being connected in series one after another by means of said data line to form a subscriber chain, each of the subscribers having a control unit, the subscribers being actuated by the data line and a communication protocol, the communication protocol having a linear array of data packets, wherein a subscriber-specific data packet is provided for each of the subscribers, a respective subscriber-specific data packet is divided into a subscriber portion and an information portion, the information portion containing a piece of information that a respective subscriber can write to about a status of the subscriber portion, the respective subscriber using a first subscriber-specific data packet with a status "Not received" as its applicable data packet and changes the status to "Received"; and
the controller and the subscribers forming a ring structure and the controller at an end of the subscriber chain checks whether the subscriber chain is correct; and
using the communication system in a motor vehicle for the subscribers.

* * * * *